United States Patent
Kim et al.

(10) Patent No.: US 10,331,439 B2
(45) Date of Patent: Jun. 25, 2019

(54) SOURCE CODE TRANSFER CONTROL METHOD, COMPUTER PROGRAM THEREFOR, AND RECORDING MEDIUM THEREFOR

(71) Applicant: Sparrow Co., Ltd., Seoul (KR)

(72) Inventors: Sungjin Kim, Seoul (KR); Kyeongcheol Kim, Seoul (KR); Wonsuk Choi, Seoul (KR); Jongyun Jung, Seoul (KR)

(73) Assignee: SPARROW CO., LTD., Seoul (KR)

( * ) Notice: Subject to any disclaimer, the term of this patent is extended or adjusted under 35 U.S.C. 154(b) by 0 days.

(21) Appl. No.: 15/541,591

(22) PCT Filed: Jan. 5, 2016

(86) PCT No.: PCT/KR2016/000057
§ 371 (c)(1),
(2) Date: Jul. 5, 2017

(87) PCT Pub. No.: WO2016/111525
PCT Pub. Date: Jul. 14, 2016

(65) Prior Publication Data
US 2018/0018165 A1  Jan. 18, 2018

(30) Foreign Application Priority Data

Jan. 8, 2015 (KR) .................. 10-2015-0002949

(51) Int. Cl.
*G06F 8/71* (2018.01)
*G06F 8/75* (2018.01)
*G06F 16/13* (2019.01)

(52) U.S. Cl.
CPC .................. *G06F 8/71* (2013.01); *G06F 8/75* (2013.01); *G06F 16/137* (2019.01)

(58) Field of Classification Search
CPC ..... G06F 8/71; G06F 8/75; G06F 8/43; G06F 17/30097; G06F 16/137
(Continued)

(56) References Cited

U.S. PATENT DOCUMENTS 8,433,687 B1 * 4/2013 Pydi .................. G06F 8/71
707/610
8,875,110 B2 * 10/2014 Lee .................... G06F 11/3604
717/142

(Continued)

FOREIGN PATENT DOCUMENTS

KR  10-2006-0069576  6/2006
KR  10-2009-0043153  5/2009
(Continued)

*Primary Examiner* — Marina Lee
(74) *Attorney, Agent, or Firm* — Lex IP Meister, PLLC

(57) ABSTRACT

Disclosed is a source code transfer control method, a computer program therefor, and a recording medium therefor. The source code transfer control method is a method executed in a configuration management system interworking with a static analyzer server. The method includes: (a) receiving a source code transfer request; (b) transmitting file identification information on a source code that is requested for transfer, to a static analyzer server; (c) receiving a return value from the static analyzer server on the basis of the file identification information, the return value being produced from an analysis result associated with the transfer-requested source code and loaded on the static analyzer server, the return value being a value produced for each check item that is preset for transfer control; and (d) providing information on whether the transfer-requested source code can be normally transferred on the basis of the return value.

8 Claims, 2 Drawing Sheets

(58) Field of Classification Search
USPC .................................................. 717/100–123
See application file for complete search history.

(56) References Cited

U.S. PATENT DOCUMENTS

| | | | | |
|---|---|---|---|---|
| 9,898,393 B2* | 2/2018 | Moorthi | ................ | G06F 11/368 |
| 2007/0006120 A1* | 1/2007 | Proebsting | ................ | G06F 8/20 |
| | | | | 717/101 |
| 2007/0234305 A1* | 10/2007 | Mishra | ................ | G06F 8/43 |
| | | | | 717/128 |
| 2012/0317554 A1* | 12/2012 | Mulat | ................ | G06F 11/3608 |
| | | | | 717/131 |
| 2013/0014093 A1* | 1/2013 | Lee | ................ | G06F 8/75 |
| | | | | 717/142 |
| 2013/0073523 A1* | 3/2013 | Gounares | ................ | G06F 17/30008 |
| | | | | 707/690 |
| 2013/0074038 A1* | 3/2013 | Fox | ................ | G06F 8/70 |
| | | | | 717/122 |
| 2013/0152047 A1* | 6/2013 | Moorthi | ................ | G06F 11/368 |
| | | | | 717/124 |
| 2013/0317889 A1* | 11/2013 | Narayanan | ................ | G06Q 10/06375 |
| | | | | 705/7.37 |
| 2014/0068567 A1* | 3/2014 | Smith | ................ | G06F 8/75 |
| | | | | 717/128 |
| 2014/0173561 A1* | 6/2014 | Toub | ................ | G06F 8/73 |
| | | | | 717/123 |
| 2014/0196010 A1* | 7/2014 | Balachandran | ................ | G06F 8/71 |
| | | | | 717/124 |
| 2018/0018165 A1* | 1/2018 | Kim | ................ | G06F 8/71 |

FOREIGN PATENT DOCUMENTS

| | | |
|---|---|---|
| KR | 10-0939020 | 1/2010 |
| KR | 10-1077561 | 10/2011 |

* cited by examiner

[Fig. 1]
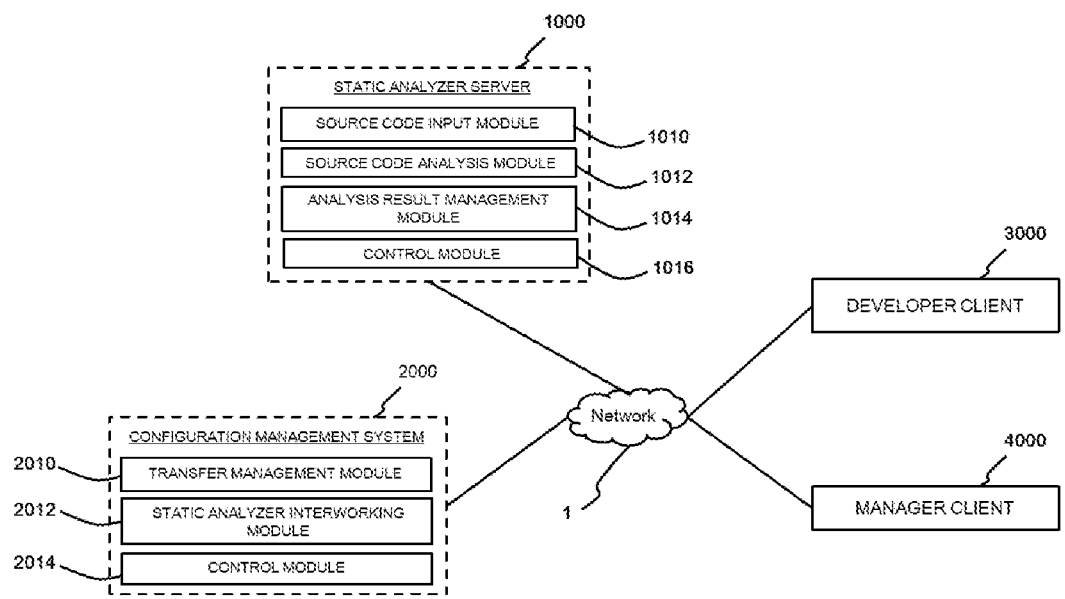

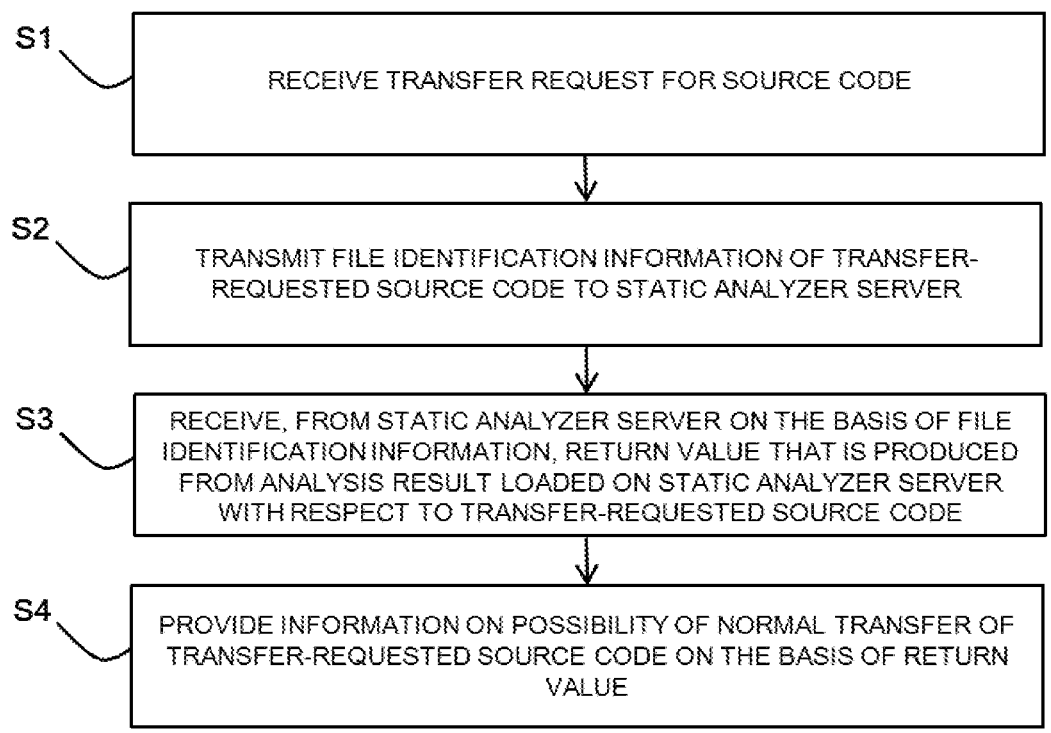

SOURCE CODE TRANSFER CONTROL METHOD, COMPUTER PROGRAM THEREFOR, AND RECORDING MEDIUM THEREFOR

TECHNICAL FIELD

The present invention relates to a source code transfer control method, a computer program therefor, and a recording medium therefore. More particularly, the present invention relates to a source code transfer control method, a computer program therefor, and a recording medium therefor, the source code transfer control method loading the results of routine static analysis of a source code (i.e., configuration management target), performed by a static analyzer, during development of the source code, on a static analyzer server, and verifying transfer suitability of the source code on the basis of the analysis results loaded on the static analyzer server when there is a developers transfer request for the source code, whereby the source code transfer control method can reduce time and resources required for source code configuration management.

BACKGROUND ART

Configuration management refers to management of all activities related to changes in all constituent elements (i.e. software source code, development environment, build structure, etc.) of computer software, in a computer software development process ranging from a starting stage of development of a project to a final stage at which maintenance is performed.

In a narrow sense, configuration management is considered management of changes(revisions) in a source code produced at implementation and testing of computer software.

Various conventional configuration management systems used for configuration management have been proposed. For example, a conventional configuration management (transfer control) method using a configuration management system is performed in the way described below.

1) A configuration management system receives a transfer request for a source code, from a developer.

The acceptance of the transfer request is carried out in the following sequence: first, the source code that is a transfer request target is added to storage (configuration management storage) or the source code added to the storage is checked out to allow changes thereof; and the changed source code is checked in.

2) The configuration management system calls an analysis engine.

3) The analysis engine analyzes the transfer-requested source code for each check item.

The check items are items associated with a source code stability criterion preset by a manager. For example, the check items may include whether a worker's source code complies with an organization's code conventions or other standards, whether the source code is checked for security or not, and the results of the source code security checking, etc.

4) The configuration management system verifies transfer suitability of the transfer-requested source code with a return value or an identification value which is a value based on the analysis results.

In the above-described conventional configuration management method, a static analysis tool is typically used as an analysis engine that analyzes the transfer-requested source code. The static analysis tool performs static code analysis with respect to a source code that is a configuration management target, detects errors or weak points in the source code, and informs a developer (or a person in charge of analysis) of the detected errors. As the static analysis tool having an automatic source code analysis function, various products have been released.

A transfer control process performed by a conventional configuration management system has problems and limitations described below.

Since the configuration management system calls an analysis engine to implement an analysis function after receiving a developer's transfer request for a source code, it takes time to establish transfer control environment and deal with the transfer of the source code.

In addition, since analysis needs to be performed at every source code transfer event, the time for transfer control is unnecessarily increased.

In addition, since every source code analysis operation consumes system resources, excessive system resources are required.

DISCLOSURE

Technical Problem

Accordingly, the present invention has been made keeping in mind the above problems occurring in the related art, and an object of the present invention is to provide a source code transfer control method, a computer program therefor, and a recording medium therefor, the source code transfer control method loading the results of routine source code analysis performed by a static analyzer during development of a source code that is a configuration management target, on a static analyzer server, and checking the source code for transfer suitability thereof on the basis of the analysis results loaded on the static analyzer server when a developer's transfer request for the source code is made, whereby the source code transfer control method can reduce time and resources required for source code configuration management.

Technical Solution

In order to accomplish the above object, the present invention provides a source code transfer control method executed in a configuration management system interworking with a static analyzer server, the method including: (a) receiving a transfer request for a source code; (b) transmitting file identification information on the transfer-requested source code to a static analyzer server; (c) receiving a return value from the static analyzer server on the basis of the file identification information, the return value being produced on the basis of analysis results associated with the transfer-requested source code and loaded on the static analyzer server (the return value being produced for each check item that is preset for transfer control); and (d) providing information on whether the transfer-requested source code can be normally transferred on the basis of the return value.

Preferably, the file identification information may include at least any one of a file name and a file hash value of the transfer-requested source code.

Preferably, the transmitting of the file identification information to the static analyzer server may be performed by calling a representational safe transfer (Rest) API provided by a static analyzer of the configuration management system and transmitting at least any one of the file name and the file hash value of the transfer-requested source code as the file identification information to the static analyzer server.

Preferably, the analysis results loaded on the static analyzer may be loaded on the static analyzer server as the results of analysis routinely performed by the static analyzer during development or revision of the source code.

Preferably, the preset check items may be items associated with source code stability.

Preferably, the preset check items may include at least any one of whether the transfer-requested source code complies with code conventions, whether the transfer-requested source code complies with a programming standard, and whether the transfer-requested source code complies with a security criterion.

Preferably, the return value may be any one of three return result values: a first return result value indicating that the transfer-requested source code complies with a preset source code stability criterion; a second return result value indicating that the transfer-requested source code does not comply with the preset source code stability criterion; and a third return result value indicating that there is no analysis result for the preset check item.

Preferably, in the step (c), when the return value is the second return result value, the configuration management system receives a URL of an error list that is a cause of noncompliance with the source code stability criterion from the static analyzer server, and in the step (d), the configuration management system provides information about the error that is a cause of noncompliance with the source code stability criterion, by referring to the URL.

According to another aspect, there is provided a computer program, recorded on a recording medium, for implementing the source code transfer control method in association with a hardware device.

According to a further aspect, there is provided a computer readable recording medium recorded with a computer program for executing each stage of the source code transfer control method.

Advantageous Effects

As described above, according to the present invention, at every source code analysis event performed for transfer control, it is not necessary to use system resources, but rather analysis results of a source code for a specific check item and compliance of the source code with a stability criterion are checked on the basis of analysis results obtained through routine source code analysis and loaded on the static analyzer server during development of source code. Therefore, the present invention has an advantage of reducing resources required for source code analysis and time for transfer.

In addition, since the present invention uses a Rest API provided by a static analyzer server, it is possible to reduce time for establishing transfer control environment and dealing with source code transfer in the source code configuration management.

DESCRIPTION OF DRAWINGS

FIG. 1 is a system configuration diagram of a configuration management system according to one embodiment of the present invention; and FIG. 2 is a flowchart illustrating a source code transfer control method according to one embodiment of the present invention.

MODE FOR INVENTION

The present invention may be embodied in many different forms without departing from the spirit and significant characteristics of the present invention. Accordingly, embodiments of the invention are disclosed only for illustrative purposes and should not be construed as limiting the invention.

It will be understood that, although the terms first, second, third etc. may be used herein to describe various elements, these elements should not be limited by these terms. These terms are used to distinguish one element from another. Thus, a first element discussed below could be termed a second element without departing from the teachings of the inventive concepts. As used herein, the term "and/or" includes any and all combinations of one or more of the associated listed items.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to," should be construed in the same way.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, preferred embodiments of the invention will be described with reference to the accompanying drawings. Throughout the drawings, like reference signs refer to like elements and repetitive description thereof will be avoided. Repeated descriptions and descriptions of known functions and configurations which have been deemed to make the gist of the present invention unnecessarily obscure will be omitted below.

FIG. 1 is a system configuration diagram of a configuration management system according to one embodiment of the present invention.

A configuration management system 2000 and a static analyzer server 1000 interwork with each other. In addition, a developer client 3000 working on development of a source code, i.e. a configuration management target, and a manager client 4000 performing configuration management also interwork with the configuration management system and the static analyzer server through a network. In the description of the embodiment, the term "interwork" means not only operational linking through a typical communication network such as LAN but also means a case in which a system includes servers performing specific functions, and modules or the servers are functionally linked to each other.

The configuration management system 2000 is a system for managing all activities associated with changes (revisions) in source code, development environment, build structure, etc. of computer software during a computer software project ranging from a development stage to a maintenance stage (final stage). Specifically, according to the present embodiment, the configuration management system 2000 is considered a system that manages changes in a source code produced at implementation and test stages of computer software.

The configuration management system 2000 according to the present embodiment includes: a transfer management module 2010 managing a transfer control process ranging from reception of a transfer request for a source code from the developer client 3000 to execution of a source code transfer (source code commit); a static analyzer interworking module 2012 providing information on transfer suitability of the transfer-requested source code by interworking with the static analyzer server 1000; and a control module 2014 performing overall management and control of each module.

The source code requested for transfer by the developer client 3000 is a product of a project that is a configuration management target and is registered in advance in the configuration management system 2000. This source code is checked for errors or weak points by a static analyzer installed in the static analyzer server 1000, randomly or at preset times within a development process (coding process). Lists of errors and URL (Uniform Resource Locator)s associated with the error lists are loaded on the static analyzer server 1000.

According to the present embodiment, each module of the configuration management system 2000 can be collectively integrated in a single module or may be further divided into smaller modules.

The static analyzer server 1000 includes a source code input module 1010, a source code analysis module 1012, an analysis result management module 1014, and a control module 1016.

For example, the source code input module 1010 receives a source code to be analyzed, in the form of a source code file, so that the source code analysis module 1012 described below can subsequently analyze the source code. For example, the reception of the source code file is performed in a manner in which the source code file is input or open through the developer client 3000.

The source code analysis module 1012 performs static analysis of a source code of a computer program, thereby generating information on errors in the source code. According to the preferred embodiment, the source code analysis module 1012 includes a syntax analysis unit and an error detection unit.

The syntax analysis unit abstracts or parses various information needed for analysis from the input source code and refines the information. The information needed for analysis may include, for example, an abstract syntax tree, the number of lines in the source code, and position information.

The error detection unit detects error information of potential problems in the source code, on the basis of the information refined by the syntax analysis unit. The error detection of the error detection unit is performed by a checker function that checks for errors. The error information is categorized into position information such as the file name of a source code file with errors and line numbers of the errors, and error content information such as error types, portions that are causes of the errors, and the logic flow of the defected source code.

Examples of the detected errors may include use of undefined variables when referring to variables, inconsistency of interfaces of a module and a component, unused or ill-defined variables, uncalled codes, a logic with missing pieces or flaws (for example, potential infinite loop), noncompliance with code conventions, noncompliance with programming standards, and noncompliance with security criteria.

Specifically, according to the present embodiment, among the various error check items, error detection results associated with compliance and noncompliance of a source code with code conventions, compliance and noncompliance with programming standards, and compliance and noncompliance with security criteria are preset and managed as primary check items to verify stability of the source code at the time of source code transfer control of the configuration management.

In the configuration management (specifically in transfer control) of a source code, code inspection or source code security analysis is a key check item required for verification of source code stability.

For example, as to the code inspection, when a developer wants to export a source code that is changed according to a change request (CR) to configuration management storage (or when a developer makes a build and deployment request for a source code), the source code written by the developer is first checked for compliance with an organization's code conventions or other standards, and only items that comply with criteria are stored in the configuration management storage or undergo a build and deployment process.

In addition, as to the source code security analysis, configuration items (source code) are checked for security before the build and deployment of the configuration items. For example, checking for security vulnerability in the source code, i.e. an SQL injection for the source code, is performed, and then only verified items are deployed in servers.

On the other hand, the check items can be suitably changed according to settings of the configuration management process. Alternatively, the check items may be set in a manner that a manager inputs the check items through the manager client 4000 or that a developer or a person in charge of source code management can make a check item setting request through the developer client 3000 which has made a source code transfer request.

The syntax analysis function of the syntax analysis unit and the error detection function of the error detection unit may be implemented in a similar or same way as a syntax analysis function and an error detection function of various known static analysis tools. As the static analysis tools, there are various commercial products that are based on syntactic analysis or semantic analysis. Therefore, a detailed description about the syntax analysis function and the error detection function will be omitted.

The error detection of the error detection unit may be performed by execution of functions of checkers provided to check for an error for each check item.

The analysis management module 1014 transmits the error information received from the source code analysis module 1012 to the developer client 3000 so that a developer can edit the source code to eliminate the errors, or loads a list of errors on a server. The errors may be managed in the form of an error list. The error lists are managed by being associated with respective URLs.

The control module 1016 performs overall management and control of all of the modules.

According to other embodiments of the present invention, the modules of the static analyzer server 1000 may be collectively integrated in a single module or may be divided into smaller modules.

FIG. 2 is a flowchart illustrating a source code transfer control method according to the embodiment of the invention. The source code transfer control method of the present embodiment is executed in a configuration management system interworking with a static analyzer server.

At Step S1, the configuration management system receives a transfer request for a source code from a developer client.

The developer client is considered a client computer used by a source code developer or a source code manager.

The reception of the source code is performed by exporting the transfer-requested source code to the configuration management storage (repository) of the configuration management system.

At Step S2, the configuration management system transmits file identification information of the transfer-requested source code to the static analyzer server.

Examples of the file identification information include at least any one of a file name and a file hash value of the transfer-requested source code.

The file hash value may be, for example, a hash code value generated using a message-digest algorithm 5 (MD5) function. The message-digest algorithm 5 (MD5) is a 128-bit encryption hash function and is designated as RFC 1321. The MD5 is used for integrity verification to assure that a program or file is intact. In the present embodiment, the MD5 is used to calculate a file hash value (hash code) for the purpose of using existing source code analysis results stored in the static analyzer server, and the file hash value is used as an identification code of the source code that is stored in the static analyzer server and a developer's computer and which is a target to be transferred for configuration management.

In addition, the transmission of the file identification information to the static analyzer server may be performed, for example, in a manner that the configuration management system calls a representational safe transfer (Rest) API (Application Programming Interface) and transmits at least any one of the file name and the file hash value of the transfer-requested source code to the static analyzer server as the file identification information.

Use of the Rest API has an advantage of being capable of determining suitability of transfer control of the source code by communicating necessary minimum information required for transfer control with the static analyzer server, without changing the configuration of an existing configuration management system.

Meanwhile, the static analyzer server receives at least any one of the file name and the file hash value of the transfer-requested source code, and compares it with information of the analysis results that are obtained through routine source code analysis performed by a developer and stored therein. To this end, at least any one of the file name and the file hash value of the source code that is routinely analyzed by a developer is managed in association with the analysis results.

At Step S3, the configuration management system receives a return value with respect to the transfer-requested source code, from the static analyzer server, on the basis of the file identification information. The return value is a value generated on the basis of the analysis results loaded on the static analyzer server.

For example, the analysis results loaded on the static analyzer server are analysis results obtained through routine analysis of the source code and loaded on the static analyzer server during development or revision of the source code. Due to this configuration, the developer can be a principal party to perform source code inspection or verification for transfer control through routine source code analysis, even without change in existing environment for source code analysis, and the analysis results obtained through routine analysis are loaded on the static analyzer server at every analysis event and can be used as analysis results for transfer control.

Meanwhile, for example, the return value is a value that is generated on the basis of each check item that is preset for transfer control.

Preferably, the preset check items are items associated with the stability of the source code. For example, the preset check items may include at least any one of compliance with code conventions, compliance with programming standards, and compliance with security criteria of the transfer-requested source code. The return value for each check item is generated according to whether the error detection result of the static analyzer complies with a predetermined criterion preset by a manager. The criterion may be set, for example, in consideration of presence or absence of errors, the frequency of occurrences of errors, the number of errors, etc. For example, the case in which there is no error or the case in which the frequency or the number of errors is equal to or less than a predetermined value is considered to comply with the stability criterion.

For example, the return value may be any one of three return result values: a first return result value (for example, return result value of "1") indicating that the transfer-requested source code complies with the preset source code stability criterion; a second return result value (for example, return result value of "0") indicating that the transfer-requested source code does not comply with the preset source code stability criterion; and a third return result value (for example, return result value of "−1") indicating that there is no analysis result associated with the preset check item.

Specifically, when the return value is the second return result value (for example, return result value of "0"), the URL of a list of errors which are causes of noncompliance with the stability criterion may be transmitted from the static analyzer server. Thus, a manager or developer can verify whether the source code can undergo normal transfer, discern problems, and take actions to solve the problems by seeing a displayed screen of the configuration management system. The configuration management system can provide information on the stability of the source code or the risk (counter concept of the stability) of the source code in the form of leveled values. For example, a risk level can be calculated by combining the checking results of each check item.

At Step S4, the configuration management system provides information on whether the transfer-requested source code can be normally transferred to the developer client or manager client, on the basis of the return value. The manager client may be considered a client computer of a manger who manages the source code configuration.

Meanwhile, at Step S3, when the return value is the second return result value, the configuration management system may provide information on the errors that are causes of noncompliance with the stability criterion by referring to the URL of the error list to the manager client or the developer client. Thus, the developer or manager can be aware of details of the errors that prevent normal transfer control, by referring to the URL of the error list, thereby solving the problems.

The Rest API for checking transfer suitability (whether normal transfer is possible) can be configured in a way described below.

Table 1 is a sample of a parameter value to check information

TABLE 1

| Required parameter value | Explanation |
| --- | --- |
| listMap: List<Map<String, String>> | File list |

Table 2 is a sample of a result return value.

TABLE 2

| Required parameter value | Explanation |
| --- | --- |
| key: String | input file key value |
| hash: String | input file hash value |
| file: String | input file name |
| url: String | address of screen of errors of the file |
| certifiedCode: String | Stability code values according to error warning setting values<br>"1": analysis success - complying with a source code stability criterion set by a manager<br>"0": manager - failing to comply with the source code stability criterion set by the manager<br>"−1": general user - there is no information of source code inspection results |

Table 3 is a sample to create a Rest client, an input map, and a list map, to add input data, and to create a transmission result.

TABLE 3

```
//create REST Client
    //assume connection URL: "127.0.0.1:18080"
    NestRestClient restClient = new
NestRestClient("120.0.0.1:18080");
    //create input Map
    Map<String, List<Map<String, String>>> map = new
HashMap<String, List<Map<String, String>>>();
        //list Map - use Map object to create JSON format data
        //input JSON example)
        List<Map<String, String>>listMap = new
ArrayList<Map<String, String>>();
        map.put("list", listMap);
        //method for adding input data, 1) used when hash is
externally autonomously created
        //parameter: list map, whole file path or file name,
hash value, key value (used to map input data and result
with each other when list is input)
System.out.println("add result . . . . . . " +
restClient.addFileInfo(listMap,
"ProjectGroupService.java",
"e20d80006560637bc20e711fd7ac158b27bf0827", "1"))
        //transmission result /////////////////////
        //transmit and receive result - result is received in
```

TABLE 3-continued

```
JSON format and transformed into Map object, and return is
received
    Map<String, Map<String, String>>resultMap =
restClient.getFileInfos(map);
```

Table 4 is a sample of a display of the transmission result.

TABLE 4

```
//result display /////////////////////
    //result display
    Map<String, String> resultDataMap = null;
    for (String key: resultMap.keySet( )) {
        resultDataMap = resultMap.get(key);
        //key: file key value that is input
            System.out.print("key:" + key);
        //hash: file hash value that is input
            System.out.print(", hash:" +
resultDataMap.get("hash"));
        //file: file name that is input
            System.out.print(", file:" +
resultDataMap.get("file"));
            //url: address of screen of errors of the file
            System.out.print(", url:" + resultDataMap.get("url"));
            //certifiedCode: code value indicating compliance with
stability criterion according to error warning setting
values
            //analysis success [1]: complying with a source code
stability criterion set by a manager
            //below analysis standard [0]: failing to comply with a
source code stability criterion set by a manager
            //no analysis result [−1]: there is no information for
source code inspection
            System.out.print(",           certifiedCode:"         +
resultDataMap.get("certifiedCode"));
            //lv1~lv5: information on degree of risk
            System.out.print(", lv1:" + resultDataMap.get("lv1"));
            System.out.print(", lv2:" + resultDataMap.get("lv2"));
            System.out.print(", lv3:" + resultDataMap.get("lv3"));
            System.out.print(", lv4:" + resultDataMap.get("lv4"));
            System.out.print(", lv5:" + resultDataMap.get("lv5"));
    }
```

Embodiments of the invention include a computer program for performing operations that can be executed by various computers, and a computer readable recording medium on which the computer program is recorded. The computer readable recording medium may include program instructions or commands, local data files, and local data structures solely or in combination. The medium may be a dedicated storage device specially designed for the present invention or may be a recording medium that is well-known to those ordinarily skilled in the art of computer software. For example, the recording medium may be a hardware device specially constructed to store and execute program instructions or commands singly or in combination. Examples of the recording medium may include: an electromagnetic medium such as hard disk, floppy disk, or magnetic tape; an optical recording medium such as compact disk (CD), digital versatile disk (DVD), or universal serial bus (USB) memory; a magneto-optical recording medium such as floptical disk; and a memory device such as ROM, RAM, or flash memory. Examples of the program instructions or commands include mechanical codes created by a complier or high level language codes that can be interpreted by an interpreter so as to be executed by a computer.

The invention claimed is:
1. A source code transfer control method executed in a configuration management system interworking with a static analyzer server that routinely performs source code analysis on a source code using a static analyzer during development or revision of the source code, stores analysis results of source code analysis, and manages file identification information on a source code file in association with the analysis results, the analysis results being source code error information obtained by checking the source code for errors for each of error check items set in the static analyzer, the source code transfer control method comprising:

(a) by the configuration management system, receiving a source code transfer request;

(b) by the configuration management system, transmitting file identification information on a source code that is requested for transfer, to a static analyzer server;

(c) by the configuration management system, receiving a return value from the static analyzer server on the basis of the file identification information, the return value being produced from the analysis results stored in the static analyzer server with respect to the transfer-requested source code, the return value being a value produced for each check item that is preset for transfer control, each check item preset for transfer control being a check item selected from among the error check items set in the static analyzer, the return value being a first value representing that a source code corresponding to the transfer request complies with a criterion according to the check item preset for transfer control or a second value representing that the source code corresponding to the transfer request does not comply with the criterion, the first value and the second value being different values; and (d) by the configuration management system, providing information on whether the transfer-requested source code can be normally transferred on the basis of the return value.

2. The source code transfer control method according to claim 1, wherein the file identification information includes at least any one of a file name and a file hash value of the transfer-requested source code.

3. The source code transfer control method according to claim 2, wherein the transmitting of the file identification information to the static analyzer server is performed in a manner that the configuration management system calls a representational safe transfer (Rest) application programming interface (API) provided by a static analyzer, and transmits at least any one of the file name and the file hash value of the transfer-requested source code as the file identification information to the static analyzer server.

4. The source code transfer control method according to claim 1, wherein the preset check item is an item associated with source code stability.

5. The source code transfer control method according to claim 4, wherein the preset check item includes at least any one of whether the transfer-requested source code complies with code conventions, whether the transfer-requested source code complies with a standard, and whether the transfer-requested source code complies with a security criterion.

6. The source code transfer control method according to claim 4, wherein the return value is any one of a first return result value indicating that the transfer-requested source code complies with a preset source code stability criterion, a second return result value indicating that the transfer-requested source code does not comply with the preset source code stability criterion, and a third return result value indicating that there is no analysis result related to the preset check item.

7. The source code transfer control method according to claim 6, further comprising:

receiving a URL (Uniform Resource Locator) of a list of errors that are causes of noncompliance with the source code stability criterion from the static analyzer server when the return value is the second return result value in the step (c); and providing information about the error that is the cause of noncompliance with the source code stability criterion by referring to the URL in the step (d).

8. A non-transitory computer readable recording medium storing a computer program for executing a source code transfer control method at a computer, wherein the source code transfer control method is executed in a configuration management system interworkinq with a static analyzer server that routinely performs source code analysis on a source code using a static analyzer during development or revision of the source code, stores analysis results of source code analysis, and manages file identification information on a source code file in association with the analysis results, the analysis results being source code error information obtained by checking the source code for errors for each of error check items set in the static analyzer, the source code transfer control method comprising:

(a) by the configuration management system, receiving a source code transfer request;

(b) by the configuration management system, transmitting file identification information on a source code that is requested for transfer, to a static analyzer server;

(c) by the configuration management system, receiving a return value from the static analyzer server on the basis of the file identification information, the return value being produced from the analysis results stored in the static analyzer server with respect to the transfer-requested source code, the return value being a value produced for each check item that is preset for transfer control, each check item preset for transfer control being a check item selected from among the error check items set in the static analyzer, the return value being a first value representing that a source code corresponding to the transfer request complies with a criterion according to the check item preset for transfer control or a second value representing that the source code corresponding to the transfer request does not comply with the criterion, the first value and the second value being different values; and (d) by the configuration management system, providing information on whether the transfer-requested source code can be normally transferred on the basis of the return value.

* * * * *